US011631029B2

(12) United States Patent
Puri et al.

(10) Patent No.: US 11,631,029 B2
(45) Date of Patent: Apr. 18, 2023

(54) GENERATING COMBINED FEATURE EMBEDDING FOR MINORITY CLASS UPSAMPLING IN TRAINING MACHINE LEARNING MODELS WITH IMBALANCED SAMPLES

(71) Applicant: Adobe, Inc., San Jose, CA (US)

(72) Inventors: Nikaash Puri, New Delhi (IN); Balaji Krishnamurthy, Noida (IN); Ayush Chopra, Delhi (IN)

(73) Assignee: Adobe Inc., San Jose, CA (US)

( * ) Notice: Subject to any disclaimer, the term of this patent is extended or adjusted under 35 U.S.C. 154(b) by 377 days.

(21) Appl. No.: 16/564,531

(22) Filed: Sep. 9, 2019

(65) Prior Publication Data

US 2021/0073671 A1 Mar. 11, 2021

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC .......... G06N 20/00; G06N 5/04; G06N 3/084; G06N 3/00; G06N 5/00; G06N 10/00; G06N 7/00; G06N 99/00
See application file for complete search history.

(56) References Cited

U.S. PATENT DOCUMENTS

2019/0318722 A1* 10/2019 Bromand ................ G10L 13/02

OTHER PUBLICATIONS

Show-Jane Yen, Yue-Shi Lee, Cluster-based under-sampling approaches for imbalanced data distributions, Expert Systems with Applications,vol. 36, Issue 3, Part 1 (Year: 2009).*
T. Sandhan and J. Y. Choi, "Handling Imbalanced Datasets by Partially Guided Hybrid Sampling for Pattern Recognition," 2014 22nd International Conference on Pattern Recognition, 2014, pp. 1449-1453, doi: 10.1109/ICPR.2014.258. (Year: 2014).*
"Dynamic Sampling Approach to Training Neural Networks for Multiclass Imbalance Classification" Lin et al (Year: 2013).*
Chawla, Nitesh V., et al. "SMOTE: synthetic minority oversampling technique." Journal of artificial intelligence research 16 (2002): 321-357.

(Continued)

*Primary Examiner* — Luis A Sitiriche
(74) *Attorney, Agent, or Firm* — Keller Preece PLLC

(57) ABSTRACT

Systems, methods, and non-transitory computer-readable media are disclosed for generating combined feature embeddings for minority class upsampling in training machine learning models with imbalanced training samples. For example, the disclosed systems can select training sample values from a set of training samples and a combination ratio value from a continuous probability distribution. Additionally, the disclosed systems can generate a combined synthetic training sample value by modifying the selected training sample values using the combination ratio value and combining the modified training sample values. Moreover, the disclosed systems can generate a combined synthetic ground truth label based on the combination ratio value. In addition, the disclosed systems can utilize the combined synthetic training sample value and the combined synthetic ground truth label to generate a combined synthetic training sample and utilize the combined synthetic training sample to train a machine learning model.

20 Claims, 10 Drawing Sheets

(56) References Cited

OTHER PUBLICATIONS

Han H., Wang WY., Mao BH. (2005) Borderline-SMOTE: A New Over-Sampling Method in Imbalanced Data Sets Learning. In: Huang DS., Zhang XP., Huang GB. (eds) Advances in Intelligent Computing. ICIC 2005. Lecture Notes in Computer Science, vol. 3644. Springer, Berlin, Heidelberg.

L. Demidova and I. Klyueva, "SVM classification: Optimization with the SMOTE algorithm for the class imbalance problem," 2017 6th Mediterranean Conference on Embedded Computing (MECO), Bar, 2017, pp. 1-4. http://ieeexplore.ieee.org/stamp/stamp.jsp?tp=&arnumber=7977136&isnumber=7977112.

"Support-vector machine," Wikipedia: The Free Encyclopedia, downloaded Sep. 16, 2019, https://en.wikipedia.org/wiki/Support-vector_machine.

C. Elkan, "The foundations of cost-sensitive learning," in Proc. Int. Joint Conf. Artificial Intelligence (IJCAI'01), pp. 973-978, 2001.

K. M. Ting, "An instance-weighting method to induce cost-sensitive trees," IEEE Transaction on Knowledge and Data Engineering, 14: pp. 659-665, 2002.

Giovanni Mariani et al."BAGAN: Data Augmentation with Balancing GAN," (Submitted on Mar. 26, 2018 (v1), last revised Jun. 5, 2018 (this version, v2)), https://arxiv.org/abs/1803.09655.

Fabio Henrique Kiyoiti dos Santos Tanaka et al., "Data Augmentation Using GANs," Submitted on Apr. 19, 2019, https://arxiv.org/abs/1904.09135.

He, Haibo, et al. "ADASYN: Adaptive synthetic sampling approach for imbalanced learning." 2008 IEEE International Joint Conference on Neural Networks (IEEE World Congress on Computational Intelligence). IEEE, 2008.

Hongyi Zhang et al., "mixup: Beyond Empirical Risk Minimization," (Submitted on Oct. 25, 2017 (v1), last revised Apr. 27, 2018 (this version, v2)), https://arxiv.org/abs/1710.09412.

\* cited by examiner

| Approach | #Generated Samples | Performance |
|---|---|---|
| SMDOTE | 210k | 0.881455 |
| ADASYN | 210k | 0.909532 |
| GAN | 200k | 0.912671 |
| Digital Synthetic Data System (Uniform) | 100k | 0.920354 |
| Digital Synthetic Data System (Uniform) | 300k | 0.929203 |
| Digital Synthetic Data System (Beta) | 100k | 0.923454 |
| Digital Synthetic Data System (Beta) | 300k | 0.932115 |

*Fig. 7*

GENERATING COMBINED FEATURE EMBEDDING FOR MINORITY CLASS UPSAMPLING IN TRAINING MACHINE LEARNING MODELS WITH IMBALANCED SAMPLES

BACKGROUND

Recent years have seen a rapid increase in the utilization of computer-implemented machine learning models to perform a variety of tasks. For example, conventional systems utilize machine learning models to edit digital videos/digital images, generate digital predictions, and/or classify digital objects. Many conventional systems build and train these machine learning models by analyzing historical training data. In particular, conventional systems analyze historical training data to teach or tune machine learning models to increase the accuracy of machine learning model outputs/predictions. For example, many machine learning models utilize training data that include classification information (e.g., ground truth labels) to build a computer-implemented model capable of making a prediction or decision based on patterns reflected in the training data.

Although conventional classification systems utilize machine learning models trained using training data to classify and/or predict from input data, they have a number of shortcomings in relation to accuracy, efficiency, and flexibility of operation. For instance, conventional systems frequently train machine learning models in circumstances where training data is imbalanced (e.g., the training data includes numerous training samples from one class but only a sparse number of training samples from another class). Class imbalance in training data can lead to a variety of inaccuracies in resulting machine learning models. For example, training on imbalanced training samples can result in over-fitting the model to one or more predominant classes or inaccurately modeling variations and trends in the minority samples.

In an attempt to address these concerns, some conventional classification systems seek to account for imbalanced training data sets in training machine learning models. For example, some conventional systems will oversample minority class training data, utilize cost sensitive learning to handle imbalanced classes within a set of training data points, and/or generate synthetic training data utilizing Generative Adversarial Networks. While attempting to balance an imbalanced set of training data points, such conventional classification systems often increase the deviation from a minority class distribution in a set of training data points and are often unable to increase the accuracy with which a minority class can be modeled within the set of training data points. As such, even with efforts to balance training sets, conventional classification systems often fail to accurately train machine learning models.

Furthermore, some conventional classification systems often inefficiently utilize computational resources. For example, many conventional classification systems utilize significant computing resources in generating and storing training samples. For example, conventional systems that utilize a Generative Adversarial Network expend significant processing power to generate synthetic training samples and then store and analyze these samples. Additionally, conventional classification systems often result in machine learning models that are inaccurate and, therefore, result in additional inefficiencies (e.g., the cost of misclassifying an abnormal example as a normal example is often much higher than the cost of reverse error by misclassifying a normal example as an abnormal example).

In addition, many conventional classification systems are rigid and inflexible in dealing with sparse training data. For instance, some conventional classification systems can only operate in training and utilizing machine learning models after generating, purchasing, or gathering a sufficient corpus of training data across a variety of classes. Accordingly, many conventional classification systems often fail to generate accurate machine learning models in circumstances where sparse training resources exist for particular training classes.

SUMMARY

One or more embodiments described herein provide benefits and solve one or more of the foregoing or other problems in the art with systems, methods, and non-transitory computer readable media that generate combined feature embeddings for minority class upsampling in training machine learning models with imbalanced training samples. For instance, in one or more embodiments, the disclosed systems generate between-class training samples to augment a set of training samples by combining existing training samples. In particular, the disclosed systems can combine existing training samples from different classes utilizing a sampled combination ratio to generate a combined synthetic training sample. The disclosed systems can then utilize the combined synthetic training sample to train a machine learning model. By combining existing training samples, the disclosed systems can efficiently augment a set of training samples without increasing deviation from a minority class distribution within the set of training samples. Moreover, the disclosed systems can accurately and flexibly train a machine learning model, even in circumstances where sparse samples exist for one or more training classes.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIG. 7 illustrates experimental results of training a machine learning model using combined synthetic training samples generated in accordance with one or more embodiments herein.

DETAILED DESCRIPTION

Figure 1:
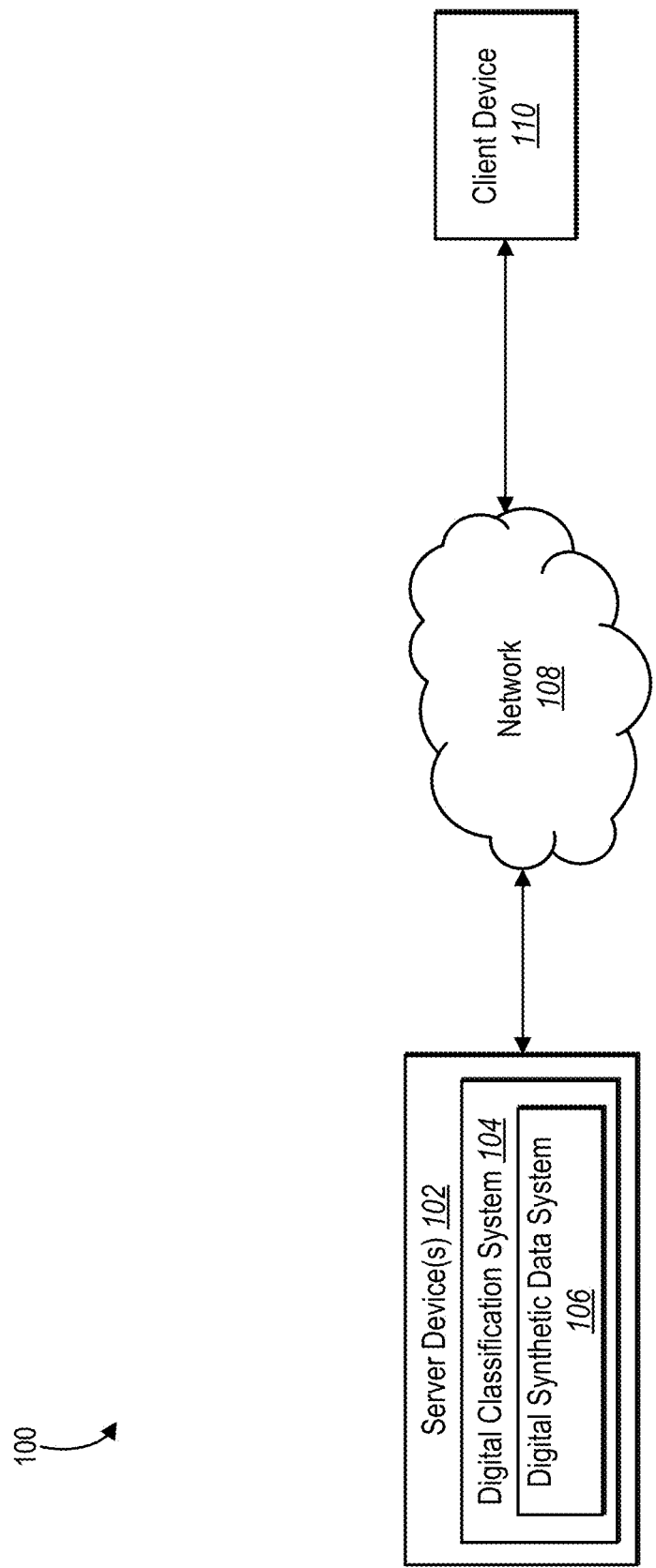
FIG. 1 illustrates a schematic diagram of an example environment in which a digital synthetic data system can operate in accordance with one or more embodiments.

One or more embodiments of the present disclosure include a digital synthetic data system that utilizes a non-label preserving augmentation strategy to generate combined feature embeddings for minority class upsampling in training machine learning models with imbalanced training samples. For example, the digital synthetic data system can generate combined synthetic training samples by merging training samples from a majority class and samples from a minority class from a training data set. In particular, in one or more embodiments, the digital synthetic data system samples a combination ratio and utilizes the combination ratio to generate a between-class training sample from the majority class and the minority class. By generating such a combined synthetic training sample, the digital synthetic data system can augment existing training repositories without distorting class distribution within the training data or over-fitting. Accordingly, the digital synthetic data system can utilize combined synthetic training samples to efficiently and accurately train a machine learning model and flexibly operate, even in circumstances with imbalanced training samples.

To illustrate, in one or more embodiments, the digital synthetic data system selects training sample values from a set of training samples (e.g., one training sample corresponding to a majority class and the other training sample corresponding to a minority class). Moreover, the digital synthetic data system can select a combination ratio from a probability distribution. Then, the digital synthetic data system can generate a combined synthetic training sample value from the selected training sample values using the combination ratio. Additionally, the disclosed systems can generate a combined synthetic ground truth label using the combination ratio value. The digital synthetic data system can utilize the combined synthetic training sample value and the combined synthetic ground truth label as a combined synthetic training sample for training a machine learning model.

As just mentioned, in one or more embodiments, the digital synthetic data system selects (or samples) training sample values from a set of training samples and a combination ratio. For example, the digital synthetic data system can randomly select a plurality of training sample values from a set of training samples utilized for training a machine learning model. In some embodiments, the digital synthetic data system selects a first training sample value corresponding to a first class or ground truth value (e.g., a majority class) and a second training sample value corresponding to a second class (e.g., a minority class) within the set of training samples.

Additionally, the digital synthetic data system can also sample a combination ratio. In one or more embodiments, the digital synthetic data system samples a combination ratio from a continuous probability distribution. To illustrate, the digital synthetic data system can sample a combination ratio based on a uniform probability distribution or a beta probability distribution.

Upon identifying a combination ratio, the digital synthetic data system can utilize the combination ratio to determine class distribution values. Furthermore, the digital synthetic data system can generate a combined synthetic training value based on the class distribution values. For example, to generate the combined synthetic training value, the digital synthetic data system can modify the selected training sample values using the combination ratio. Indeed, in some embodiments, the digital synthetic data system modifies a first training sample value by applying a first class distribution value (based from the combination ratio) to the first training sample value and modifies the second training sample value by applying a second class distribution value to the second training sample value. Moreover, in one or more embodiments, the digital synthetic data system then combines the modified first training sample value and the second training sample value to generate a combined synthetic training sample value.

In addition to generating combined synthetic training sample values (e.g., input values for a machine learning model), the digital synthetic data system can also generate corresponding combined synthetic ground truth values (e.g., ground truth labels for corresponding output values of the machine learning model). For instance, to generate a combined synthetic ground truth label, the digital synthetic data system can generate a new label using a sampled combination ratio (e.g., a label that represents an in-between classification). In particular, the digital synthetic data system can generate a combined synthetic ground truth label by assigning one or more values to one or more classes represented by the combined synthetic ground truth label. For example, for training samples with two possible classes, the digital synthetic data system can generate a combined synthetic ground truth label by assigning a first class distribution value (based from a combination ratio) as a label of a first class and a second class distribution value as a label of a second class.

As mentioned above, the digital synthetic data system can generate a combined synthetic training sample using the generated combined synthetic training sample value and the combined synthetic ground truth label. For instance, in one or more embodiments, the digital synthetic data system generates the combined synthetic training sample by associating a combined synthetic ground truth label with a combined synthetic training sample value (e.g., as a tuple having the combined synthetic ground truth label and the combined synthetic training sample value).

Furthermore, the digital synthetic data system can utilize a generated combined synthetic training sample to train a machine learning model. For instance, the digital synthetic data system can utilize a machine learning model to generate a predicted classification for a combined synthetic training sample value. Then, the digital synthetic data system can compare the predicted classification to a corresponding combined synthetic ground truth label to tune parameters of the machine learning model (e.g., using backpropagation). Indeed, by utilizing one or more combined synthetic training samples, the digital synthetic data system can more efficiently and accurately train a machine learning model to perform classification tasks (e.g., such as detecting fraudulent purchases based on purchase information).

The disclosed digital synthetic data system provides several advantages and practical applications over conventional classification systems. For instance, the digital synthetic data system can improve accuracy relative to conventional systems. Indeed, by generating combined synthetic training samples as described herein, the digital synthetic data system can augment training data more accurately for training machine learning models without affecting class distribution within a set of training samples. For instance, in some embodiments the digital synthetic data system can upsample minority class based training samples without increasing a deviation from the distribution of the minority class within the set of training samples. Moreover, by generating combined synthetic training samples, the digital synthetic data system can avoid over-fitting to a particular class.

Furthermore, in addition to an improvement in accuracy, the digital synthetic data system can also improve efficiency relative to conventional systems. For instance, as discussed above, the digital synthetic data system can generate combined synthetic training samples through a variety of low-overhead processes, such as sampling training samples, sampling a combination ratio, and applying a combination ratio. By utilizing the acts and algorithms described herein, the digital synthetic data system can generate a large volume of combined synthetic training samples with very few computational resources relative to conventional systems, such as Generative Adversarial Networks. Indeed, the digital synthetic data system improves data efficiency in circumstances where few examples of one class exist and also in circumstances were a fixed number of augmented samples are permitted. Moreover, by training machine learning models with the combined synthetic training samples, the digital synthetic data system results in machine learning models that less frequently misclassify minority class examples (e.g., which reduces costs related to misclassifications).

In addition, the digital synthetic data system can improve flexibility of operation relative to conventional systems. In particular, the digital synthetic data system can train machine learning models, even in circumstances with sparse training samples for a particular class. Accordingly, the digital synthetic data system can more flexibly train a variety of machine learning models for a variety of classification problems when there is an absence of quality training data.

As illustrated by the foregoing discussion, the present disclosure utilizes a variety of terms to describe features and advantages of the digital synthetic data system. Additional detail is now provided regarding the meaning of such terms. For example, as used herein, the term "training sample" (sometimes referred to as "training data") refers to data representative of a modeled characteristic or feature with a corresponding classification. In particular, a training sample can include information representative of a characteristic analyzed by a machine learning model that includes a corresponding ground truth label. In particular, a training sample can include information (e.g., a training sample value) that represents one or more characteristics and/or attributes of an object, person, place, action, event, document, image, video, historical data, or any combination thereof that includes a corresponding ground truth label to classify the information. As an example, a training sample for detecting fraudulent credit card activity can include information such a purchase date, geographic region, and purchase amount with a corresponding label that indicates the information as a situation of credit card fraud as the classification.

As used herein, the term "training sample value" (sometimes referred to as "training data point") refers to information that represents one or more characteristics and/or attributes (e.g., of an object, person, place, action, and/or event) for a training sample. For instance, a training sample value can include one or more numeric and/or text-based values (e.g., as a vector, array, list, feature map, etc.) that correspond to attributes and/or characteristics of an object, person, place, action, event, document, image, and/or video. Indeed, a training sample value can be represented as a linear combination of one or more feature embeddings. As an example, a training sample for detecting fraudulent credit card activity can include information such a purchase date, geographic region, and/or purchase amount.

Furthermore, as used herein, the term "ground truth label" refers to a known classification for a training sample value. In particular, a ground truth label can include a value (numerical and/or text-based) that indicates a classification (or categorization) for a training sample value. As an example, a ground truth label for a training sample for detecting fraudulent credit card activity can include a label indicating a particular sample as fraudulent and/or not fraudulent.

Moreover, as used herein, the term "combined synthetic training sample" refers to a new and/or unobserved training sample generated from two or more training samples. For instance, a combined synthetic training sample can include an inorganic training sample generated from a combination of a plurality of training samples to train a machine learning model. In particular, a combined synthetic training sample can include information (e.g., a synthetic training sample value) and a corresponding ground truth label (e.g., a synthetic ground truth label) generated using training samples and a combination ratio in accordance with one or more embodiments herein. As used herein, the term "synthetic training sample value" refers to a new and/or unobserved value generated from training sample values. Furthermore, as used herein, the term "combined synthetic ground truth label" refers to a new or unobserved ground truth label generated from existing ground truth labels.

As used herein, the term "class" refers to a category or classification of data. In particular, a class can include a label that indicates information (e.g., a training sample value) as belonging to a specific category. For instance, a class can include, but is not limited to, an indicator that labels information to be fraudulent or not fraudulent, a conversion or non-conversion, a type (e.g., categories such as food, cars, sports, etc.), an identification for a specific person, and/or an identification for an object. Moreover, a set of training samples can include a majority class and a minority class. As used herein, the term "majority class" includes a class that occurs most frequently within a set of training samples (e.g., more frequently than another class). A majority class can thus include a class that represents greater than 50% of the samples (e.g., in circumstances where only two classes are present). Additionally, the term "minority class" includes a class that occurs least frequently within a set of training samples (e.g., less frequently than another class), A minority class can thus include a class that represents fewer than 50% of the samples (e.g., in circumstances where only two classes are present).

As used herein, the term "probability distribution" refers to a mathematical function that reflects probabilities of occurrences of different possible results. For example, a probability distribution can include a continuous probability distribution (e.g., where possible outcomes can have values from a continuous range). Furthermore, a probability distribution can include a linear distribution (e.g., a uniform probability distribution) or a non-linear distribution (e.g., a beta probability distribution).

As used herein, the term "combination ratio" refers to a numerical value utilized to combine training samples. In some embodiments, a combination ratio can include an outcome probability (a value between 0 and 1) that is determined from a probability distribution based on a random input value. For example, a combination ratio can include a value of 0.4 (e.g., represented as λ) that is output by a probability distribution. Furthermore, as used herein, the term "distribution value" refers to a value for distributing and/or applying a combination ratio to training samples/classes in generating a combined synthetic training sample. For instance, a distribution value can be utilized to modify training sample values and/or generate combined synthetic ground truth values in accordance with one or more embodiments herein. As an example, for a combination ratio of 0.4, the digital synthetic data system can utilize a distribution value of 0.4 for a first training sample from a first class and a combination value of 0.6 (i.e., 1.0-0.4=0.6) for a second training sample from a second class.

Additionally, as used herein, a "machine learning model" refers to a computer representation or algorithm that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

As mentioned, a machine learning model can include a neural network. A neural network can include a model of interconnected artificial neurons (organized in layers) that communicate and learn to approximate complex functions and generate outputs based on a plurality of inputs provided to the model. In addition, a neural network is an algorithm (or set of algorithms) that implements deep learning techniques that utilize a set of algorithms to model high-level abstractions in data. For example, a neural network can include a convolutional neural network, a recurrent neural network, and/or a graph neural network.

Turning now to the figures, FIG. 1 illustrates a schematic diagram of a system environment 100 (or an "environment 100") in which a digital synthetic data system 106 can operate in accordance with one or more embodiments. As illustrated in FIG. 1, the environment 100 includes server device(s) 102, a network 108, and a client device 110. As further illustrated in FIG. 1, the server device(s) 102 and the client device 110 can communicate via the network 108.

As shown in FIG. 1, the server device(s) 102 can include a digital classification system 104 which further includes the digital synthetic data system 106. The digital classification system 104 can store, identify, retrieve, and/or utilize a variety of training samples for machine learning models. For instance, the digital classification system 104 can also utilize machine learning models to classify (or predict) various information. For example, the digital classification system 104 can utilize a machine learning model to predict information such as, but not limited to, future behavior of users, objects or individuals portrayed in a digital image, and/or credit card fraud.

Moreover, the digital synthetic data system 106 can generate combined synthetic training samples to train a machine learning model. In particular, the digital synthetic data system 106 can combine existing training samples by using a combination ratio to generate a combined synthetic training sample. In addition, the digital synthetic data system 106 (and/or the digital classification system 104) can utilize one or more generated combined synthetic training samples (together with existing training samples) to train a machine learning model.

In addition to implementing all or a part of the digital synthetic data system 106, the server device(s) 102 can store data for the digital synthetic data system 106. For example, the server device(s) 102 can store data such as training samples, combined synthetic training samples, data for machine learning models, and/or classifications (or outputs) of machine learning models. Moreover, the server device(s) 102 can provide such stored data to the client device 110. In some embodiments, the server(s) 104 comprises a content server. The server(s) 104 can also comprise an application server, a communication server, a web-hosting server, a social networking server, a digital content campaign server, or a digital communication management server. The server device(s) 102 can include a variety of types of computing devices, including those explained below with reference to FIG. 10.

Additionally, as mentioned above and as shown in FIG. 1, the environment 100 includes the client device 110. In one or more embodiments, the client device 110 may include, but is not limited to, a mobile device (e.g., a smartphone, tablet), a laptop, a desktop, or another type of computing device as described below with reference to FIG. 10. The client device 110 can provide information (e.g., browsing data, geographic data, e-commerce data, etc.) and other digital content (e.g., digital images, digital videos, electronic documents, etc.) as data for training a machine learning model (e.g., training samples) and/or for classification via a machine learning model. The client device 110 can communicate with the server device(s) 102 via the network 108 to provide and/or receive information and/or digital content to and/or from the server device(s) 102. For example, the client device 110 can provide a digital image to the server(s) 102 and the server(s) 102 (via the digital classification system 104) can classify an object portrayed in the digital image and provide the classified object to the client device(s) 102. Although FIG. 1 illustrates the environment 100 with a single client device 110, the environment 100 can include any number of client devices.

Additionally, as shown in FIG. 1, the environment 100 includes the network 108. As mentioned above, the network 108 can enable communication between components of the environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the client device 110, and the network 108 may communicate using any communication platforms and technologies suitable for transporting data and/or communication signals, including any known communication technologies, devices, media, and protocols supportive of data communications, examples of which are described with reference to FIG. 10. Furthermore, although FIG. 1 illustrates the server device(s)

102 and the client device 110 communicating via the network 108, the various components of the environment 100 can communicate and/or interact via other methods (e.g., the server device(s) 102 and the client device 110 can communicate directly).

In addition, although FIG. 1 illustrates the digital synthetic data system 106 being implemented by a particular component and/or device (e.g., server device(s) 102) within the environment 100, the digital synthetic data system 106 (and/or the digital classification system 104) can be implemented, in whole or in part, by other computing devices and/or components in the environment 100. For example, the digital synthetic data system 106 (and/or the digital classification system 104) can be implemented in whole, or in part, by the client device 110.

Figure 2:
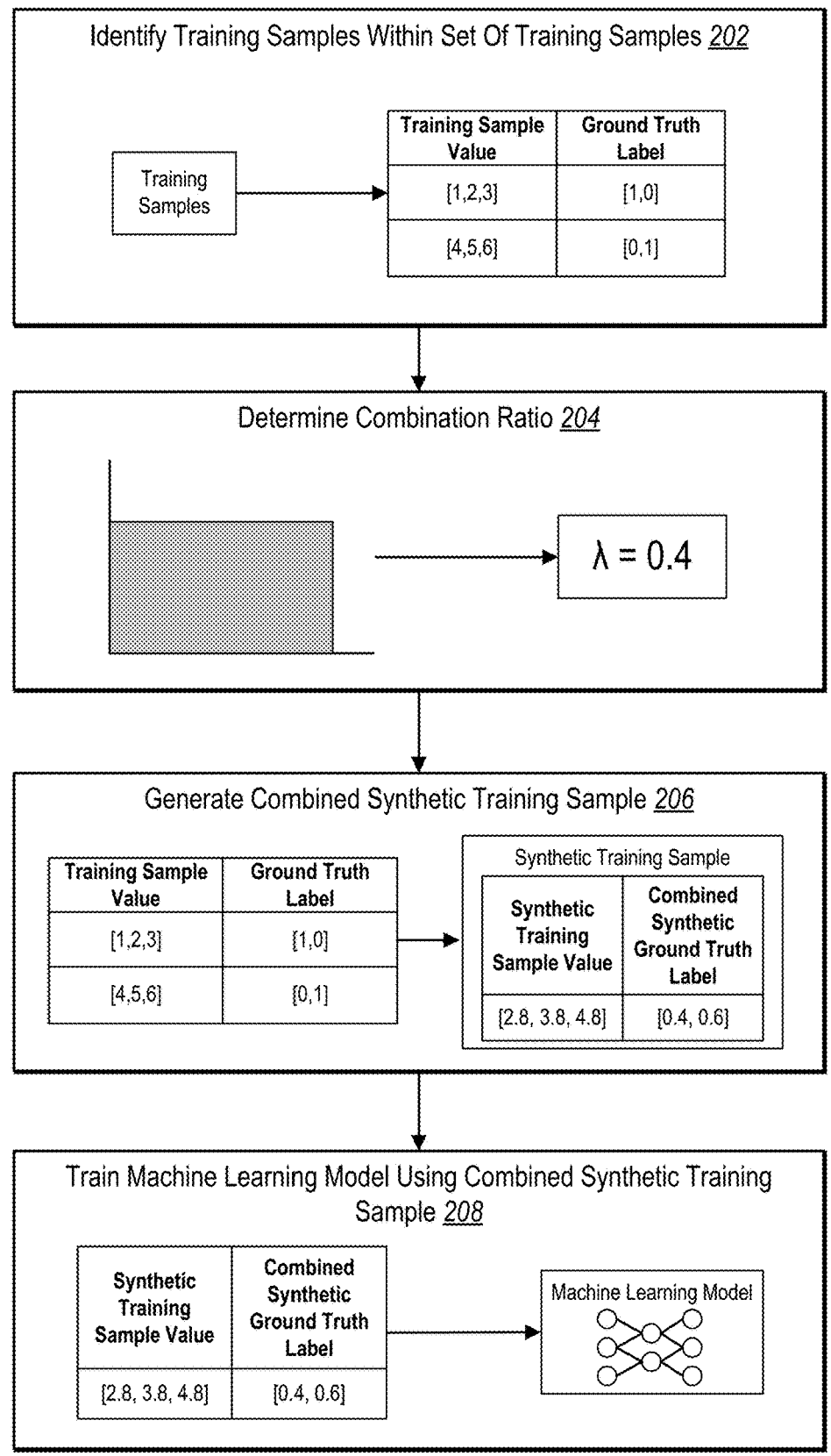
FIG. 2 illustrates a flowchart of a digital synthetic data system generating a combined synthetic training sample to train a machine learning model in accordance with one or more embodiments.

As mentioned above, the digital synthetic data system 106 can generate combined synthetic training samples to train a machine learning model. For instance, FIG. 2 illustrates a flowchart of the digital synthetic data system 106 generating a combined synthetic training sample to train a machine learning model in accordance with one or more embodiments herein. More specifically, FIG. 2 illustrates a flowchart of the digital synthetic data system 106 identifying training samples, determining a combination ratio, utilizing a combination of the training samples and the combination ratio to generate a combined synthetic training sample, and training a machine learning model with the combined synthetic training sample.

For example, as shown in FIG. 2, the digital synthetic data system 106 performs an act 202 of identifying training samples within a set of training samples. In particular, the digital synthetic data system 106 can select multiple (e.g., two, three, four, etc.) training samples from a set of training samples associated with a machine learning model. For example, in some embodiments, the digital synthetic data system 106 randomly selects a first training sample that belongs to a first class (e.g., that has a ground truth label for a majority class) and selects a second training sample that belongs to a second class (e.g., that has a ground truth label for a minority class). Thus, as illustrated in FIG. 2, the digital synthetic data system 106 selects a first training sample (including training sample values [1, 2, 3] and a ground truth label [1, 0] corresponding to a first class) and a second training sample (including training sample values [4, 5, 6] and a second ground truth label [0, 1] corresponding to a second class). Additional detail regarding the digital synthetic data system 106 selecting training samples to generate a combined synthetic training sample is provided below (e.g., in relation to FIG. 3).

In addition, as shown in FIG. 2, the digital synthetic data system 106 performs an act 204 of determining a combination ratio. In particular, the digital synthetic data system 106 samples a combination ratio from a probability distribution. For instance, as illustrated in FIG. 2, the digital synthetic data system 106 utilizes a linear distribution to sample a combination ratio of $\lambda=0.4$. Additional detail regarding the digital synthetic data system 106 determining a combination ratio and/or distribution values is provided below (e.g., in relation to FIG. 4).

Furthermore, as illustrated in FIG. 2, the digital synthetic data system 106 performs an act 206 of generating a combined synthetic training sample. For instance, the digital synthetic data system 106 can utilize a combination of selected training samples and a sampled combination ratio to generate a combined synthetic training sample. In particular, the digital synthetic data system 106 can modify selected training sample values using a combination ratio and combine the modified selected training sample values to generate a synthetic training sample value. Moreover, the digital synthetic data system 106 can also utilize the combination ratio (e.g., multiple distribution values from the combination ratio) to generate a combined synthetic ground truth label. Then, as previously mentioned, the digital synthetic data system 106 can generate a combined synthetic training sample based on the combined synthetic training sample value and the combined synthetic ground truth label.

For example, as shown in FIG. 2, the digital synthetic data system 106 modifies the first training sample values and the second training sample values based on the combination ratio determined at the act 204 (e.g., multiples the first training sample values by $\lambda$ and multiples the second training sample values by $1-\lambda$. The digital synthetic data system 106 then combines (e.g., adds) the modified training sample values, resulting the in the synthetic training sample values [2.8, 3.8, and 4.8]. The digital synthetic data system also utilizes $\lambda$ and $1-\lambda$ as the combined synthetic ground truth label. Additional detail regarding the digital synthetic data system 106 generating a synthetic training sample value, a combined synthetic ground truth label, and/or a combined synthetic training sample is provided below (e.g., in relation to FIG. 5).

Moreover, as shown in FIG. 2, the digital synthetic data system 106 performs an act 208 of training a machine learning model using a combined synthetic training sample. For example, the digital synthetic data system 106 provides a synthetic training sample value associated with a combined synthetic training sample to a machine learning model to generate a predicted classification. Furthermore, the digital synthetic data system 106 compares the predicted classification to a combined synthetic ground truth label associated with the combined synthetic training sample to fine tune the machine learning model (e.g., via backpropagation). Additional detail regarding the digital synthetic data system 106 training a machine learning model using a combined synthetic training sample (together with existing/organic training samples) is provided below (e.g., in relation to FIG. 6).

Figure 3:
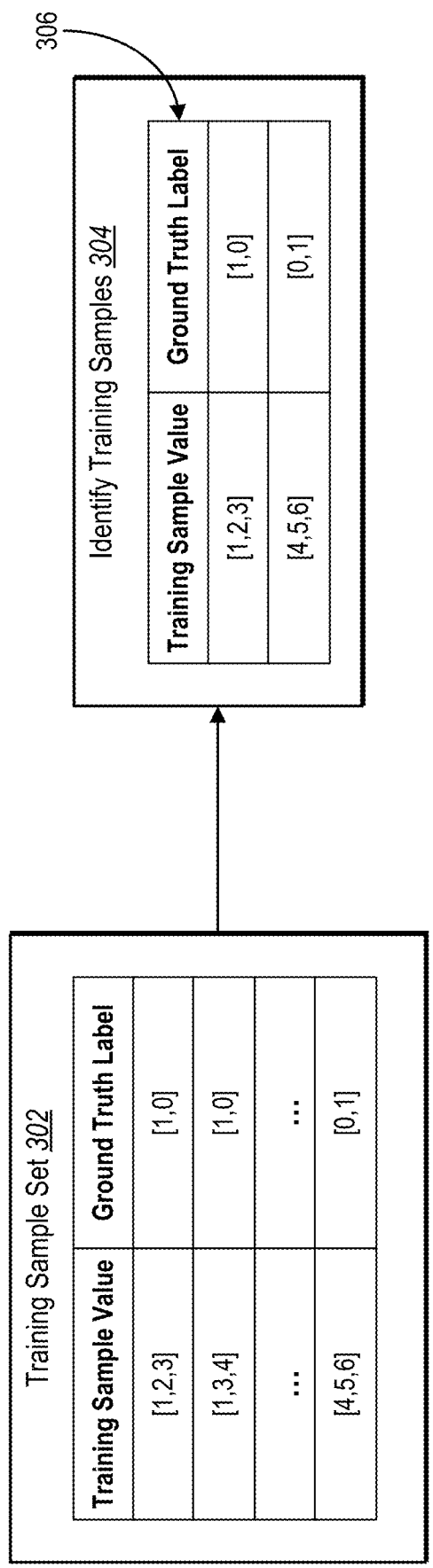
FIG. 3 illustrates a digital synthetic data system identifying training samples to generate a combined synthetic training sample in accordance with one or more embodiments.

As mentioned above, the digital synthetic data system 106 can identify training samples from a repository of training samples) and utilize the identified training samples to generate a combined synthetic training sample. For instance, FIG. 3 illustrates the digital synthetic data system 106 sampling (or selecting) training samples from a set of training samples. For example, as shown in FIG. 3, the digital synthetic data system 106 accesses a training sample set 302 which includes multiple training sample values and associated ground truth labels (e.g., as vector based values). Then, as illustrated in FIG. 3, the digital synthetic data system 106 identifies training samples in an act 304. Indeed, as shown in FIG. 3, the digital synthetic data system 106 selects the two training samples 306 (e.g., which include training sample values and associated ground truth labels) to utilize for generating a combined synthetic training sample. Indeed, in one or more embodiments, the two training samples 306 can represent specific features or characteristics (e.g., via the vector based values of the training sample values) and a classification for those features or characteristics (e.g., via the ground truth labels).

In some embodiments, the digital synthetic data system 106 can access and/or utilize various sets of training samples. For instance, the digital synthetic data system 106 can utilize a set of training samples that include any number of training samples. Furthermore, the set of training samples can be from a repository of training samples (e.g., stored on the server device(s) 102). Moreover, the digital synthetic data system 106 can access sets of training samples that correspond to training specific machine learning models or specific classification problems (e.g., a set of training samples for fraudulent credit card activity or a set of training samples for digital image recognition).

As illustrated in one or more embodiments herein, the digital synthetic data system 106 can utilize a training sample that includes vectors to represent features or characteristics (e.g., the training sample value) and a ground truth label. Although, one or more embodiments herein illustrate training samples as vectors, the digital synthetic data system 106 can utilize various types of training samples. For example, the digital synthetic data system 106 can utilize feature maps and/or feature embeddings to represent training sample values and/or ground truth labels. Moreover, the digital synthetic data system 106 can also utilize matrices, arrays, sets and/or lists to represent training sample values.

In some embodiments, the digital synthetic data system 106 can utilize a vector (or other data type) for a training sample to represent characteristics or features. The digital synthetic data system 106 can generate feature embeddings for a variety of different characteristics. For example, the digital synthetic data system 106 can embed a variety of characteristics, such as geographic location, demographic information, purchase information, and/or digital content characteristics (e.g., RGBA values, video duration, word count, etc.), into one or more feature vectors or embeddings.

Furthermore, the digital synthetic data system 106 can also utilize a vector (or other data type) for a ground truth label to represent a classification. For instance, as shown in FIG. 3, the digital synthetic data system 106 can utilize a binary array as a ground truth label where each item in the array represents a separate class. Thus, as illustrated the digital synthetic data system 106 utilizes a ground truth label that represents a first class as the first list element in an array and a second class as the second list element in the array (e.g., where the ground truth label indicates the first class is applicable by setting the first list element to a value of one and indicates that the second class is not applicable by setting the second list element to a value of zero). Although FIG. 3 illustrates a binary class, the ground truth label can utilize non-binary classifications. Indeed, a ground truth label can include a variety of different classes, such as various objects, locations, or predicted actions As an example, the digital synthetic data system 106 can utilize a training sample for predicting which video a user is likely to view. In particular, the digital synthetic data system 106 can utilize a training sample value (e.g., as a vector) associated with the training sample to represent characteristics or features for the user such as viewed videos, tags corresponding to the video, and browsing history of the user. Furthermore, the digital synthetic data system 106 can utilize a ground truth label associated with the training sample to represent a subsequently viewed video by the user (e.g., a value corresponding to the viewed video).

Moreover, as another example, the digital synthetic data system 106 can utilize a training sample for predicting which advertisement a user is likely to click (or otherwise select). In particular, the digital synthetic data system 106 can utilize a training sample value to represent features or characteristics for the user such as browsing history, recently clicked advertisements, demographic information. Moreover, the digital synthetic data system 106 can utilize a ground truth label to represent a subsequently clicked advertisement by the user. Furthermore, as another example, the digital synthetic data system 106 can utilize a training sample for predicting (or detecting) credit card fraud. In particular, the digital synthetic data system 106 can utilize a training sample value to represent features or characteristics for a credit card transaction such as transaction date, purchase amount, and geographic location and a ground truth label to represent whether the credit card transaction was fraudulent.

As shown in FIG. 3, the digital synthetic data system 106 can perform the act 304 of identifying training samples from a set of training samples to utilize for generating a combined synthetic training sample. In some embodiments, the digital synthetic data system 106 randomly selects from a set of training samples. In particular, the digital synthetic data system 106 can randomly select from a set of training samples based on ground truth label types (e.g., class types). For instance, the digital synthetic data system 106 can randomly select a first training sample corresponding to a first class type (e.g., based on the ground truth labels) and can also randomly select a second training sample corresponding to a second class type. Indeed, the digital synthetic data system 106 can select training samples between any two types of classes within the set of training samples.

In one or more embodiments, the digital synthetic data system 106 selects a pair of training samples based on majority and minority class types. In particular, the digital synthetic data system 106 can select a first training sample from a set of training samples that corresponds to the majority class type within the set of training samples. Additionally, the digital synthetic data system 106 can also select a second training sample from the set of training samples that corresponds to the minority class type within the set of training samples. Indeed, in one or more embodiments, the majority class type can include a ground truth label that occurs most frequently within a set of training samples. Moreover, the minority class type can include a ground truth label that occurs least frequently (or less frequently than the majority class type) within a set of training samples.

Furthermore, in addition to selecting training samples randomly, the digital synthetic data system 106 can also select training samples from a set of training samples based on one or more factors. For example, the digital synthetic data system 106 can select a pair of training samples based on performance of a machine learning model (e.g., in regard to the pair of training samples). For example, the digital synthetic data system 106 can select a training sample from the set of training samples that is determined to be difficult to classify using a machine learning model (e.g., based on the accuracy of a predicted classification from a machine learning model for the training sample).

In addition, the digital synthetic data system 106 can also select more than two training samples to generate a combined synthetic training sample. For example, the digital synthetic data system 106 can select training samples that correspond to more than two class types. In particular, the digital synthetic data system 106 can select more than two training samples that each correspond to a separate ground truth label (e.g., different class types) from a set of training samples. As an example, the digital synthetic data system 106 can select three training samples from a set of training samples that include three class types (e.g., three unique ground truth labels). In some embodiments the digital synthetic data system can select some training samples from the same class (e.g., two samples from a first class and one sample from a second class for generating a combined synthetic training sample).

Although one or more embodiments herein describe the digital synthetic data system 106 utilizing a pair of two training samples, the digital synthetic data system 106 can utilize any number of training samples. Furthermore, the digital synthetic data system 106 can utilize training samples having any number of ground truth label variations (e.g., any number of class types). Furthermore, the digital synthetic data system 106 can utilize training sample values and/or ground truth labels that represent any variety of values (e.g., numerical, alpha-numerical, alphabetical, etc.) for use in training machine learning models.

Figure 4:
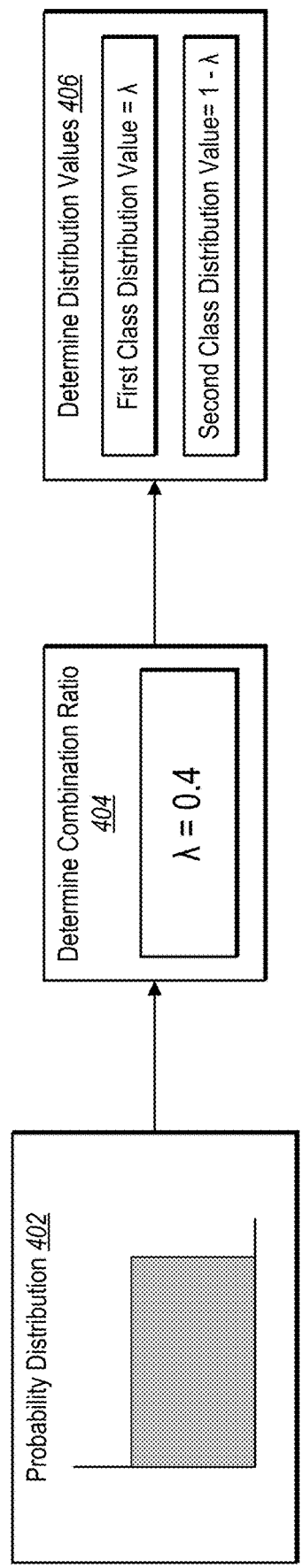
FIG. 4 illustrates a digital synthetic data system identifying a combination ratio to generate a combined synthetic training sample in accordance with one or more embodiments.

Furthermore, as mentioned above, the digital synthetic data system 106 can sample (or determine) a combination ratio. In particular, the digital synthetic data system 106 can sample a combination ratio from a probability distribution to utilize in generating a combined synthetic training sample. For instance, FIG. 4 illustrates the digital synthetic data system 106 sampling a combination ratio (e.g., $\lambda$) from a probability distribution. In particular, as shown in FIG. 4, the digital synthetic data system 106 determines a combination ratio in an act 404 from a probability distribution 402 (e.g., $\lambda=0.4$). Additionally, as shown in FIG. 4, the digital synthetic data system 106 also determines distribution values in an act 406 (e.g., a first class distribution value that is equal to $\lambda$ and a second class distribution value that is equal to $1-\lambda$).

In one or more embodiments, the digital synthetic data system 106 can utilize a continuous probability distribution to sample a combination ratio. In particular, the digital synthetic data system 106 can utilize a linear continuous probability distribution (e.g., a uniform distribution from 0 to 1). In one or more embodiments, the digital synthetic data system 106 can also utilize a non-linear probability distribution. For example, the digital synthetic data system 106 can utilize a Beta distribution, such as Beta(0.2, 0.2). Indeed, the digital synthetic data system 106 can sample a combination ratio from various types of probability distributions (e.g., normal distribution, exponential distribution, binomial distribution, etc.).

Additionally, the digital synthetic data system 106 can sample a combination ratio from a probability distribution by randomly sampling a value from the probability distribution. For example, the digital synthetic data system 106 can sample a random value from within a probability distribution and utilize the selected value as the combination ratio. For instance, in a continuous and linear probability distribution (e.g., a uniform distribution from 0 to 1), the digital synthetic data system 106 can randomly sample any real number value between 0 and 1 from the probability distribution (e.g., 0.4, 0.33, 0.7, etc.).

In some embodiments, the digital synthetic data system 106 can sample the combination ratio based on a probability distribution corresponding to a set of training samples. For instance, the digital synthetic data system 106 can associate the probability distribution to one or more classes belonging to a set of training samples. Then, the digital synthetic data system 106 can sample a combination ratio from the probability distribution associated with the one or more classes of the set of training samples.

Furthermore, in some embodiments, the digital synthetic data system 106 can utilize a sampled combination ratio to determine one or more distribution values. For instance, the digital synthetic data system 106 can determine distribution values and utilize the distribution values to modify training sample values of different class types in generating a combined synthetic training sample. As an example, in some embodiments, the digital synthetic data system 106 utilizes the combination ratio value as the first class distribution value (e.g., to modify a training sample of a first class and to utilize the value for the ground truth label for the first class).

Moreover, the digital synthetic data system 106 can also determine a second class distribution value by utilizing a difference between the combination ratio and a predetermined distribution value (e.g., 1). In particular, the digital synthetic data system 106 can determine a second class distribution value by subtracting a sampled combination ratio value from 1. Although one or more embodiments herein describe the digital synthetic data system 106 determining a second class distribution value by subtracting the combination ratio value from 1, the digital synthetic data system 106 can determine the second class distribution value by subtracting the combination ratio from a variety of other values (e.g., a predetermined value, a value based on classes belonging to a set of training samples, a value determined from a probability distribution, etc.).

Additionally, the digital synthetic data system 106 can determine more than one combination ratio to determine more than two distribution values (e.g., to generate a combined synthetic training sample corresponding to more than two classes). For example, the digital synthetic data system 106 can sample more than one combination ratio value (e.g., a first combination ratio and a second combination ratio) from a probability distribution. Moreover, the digital synthetic data system 106 can determine more than two distribution values using the multiple combination ratios (e.g., utilize the first combination ratio as the first class distribution value, the second combination ratio as the second class distribution value, and a value determined from a difference of the two combination ratios and a whole distribution value as the third distribution value). In some embodiments, the digital synthetic data system 106 can also determine more than two distribution values from a single combination ratio.

Figure 5:
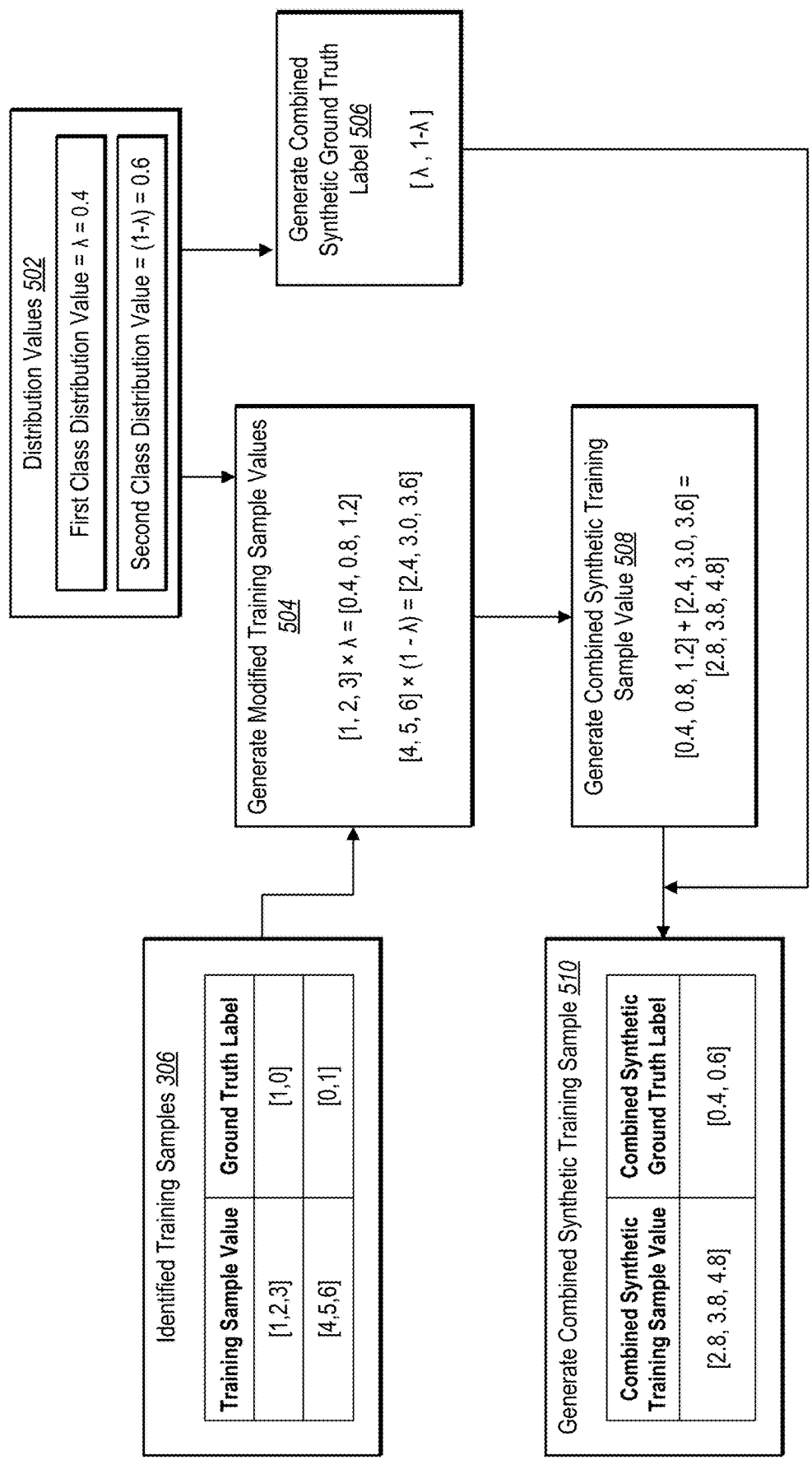
FIG. 5 illustrates a digital synthetic data system generating a combined synthetic training sample in accordance with one or more embodiments.

As mentioned above, the digital synthetic data system 106 can generate a combined synthetic training sample. Indeed, as previously mentioned the digital synthetic data system 106 can generate a combined synthetic training sample based on selected training samples and a combination ratio. For instance, FIG. 5 illustrates the digital synthetic data system 106 generating a combined synthetic training sample using selected training samples and a combination ratio. Indeed, FIG. 5 illustrates the digital synthetic data system 106 generating modified synthetic training samples from sampled training samples and a combined synthetic ground truth label from the combination ratio to generate a combined synthetic training sample.

As shown in FIG. 5, the digital synthetic data system 106 utilizes identified training samples 306 (e.g., identified training sample values) to generate modified synthetic training sample values in an act 504 (e.g., using distribution values 502). Furthermore, as illustrated in FIG. 5, the digital synthetic data system 106 combines the modified synthetic training sample values (from the act 504) to generate a combined synthetic training sample in an act 508. Additionally, as shown in FIG. 5, the digital synthetic data system 106 utilizes the distribution values 502 (e.g., a first class distribution value and a second class distribution value) to generate a combined ground truth label in an act 506. Then, as illustrated in FIG. 5, the digital synthetic data system 106 utilizes the combined synthetic training sample (from the act 508) and the combined ground truth label (from the act 506) to generate a combined synthetic training sample in an act 510.

For instance, as shown in FIG. 5, the digital synthetic data system 106 utilizes identified training samples and distribution values (determined from a combination ratio as described in FIG. 4) to generate modified synthetic training sample values. For example, the digital synthetic data system 106 modifies a training sample value by applying a distribution value determined from a combination ratio. In some embodiments, the digital synthetic data system 106 multiplies a training sample value by a distribution value. For instance, in one or more embodiments, the digital synthetic data system 106 can multiply a vector of the training sample value by the distribution value. Although one or more embodiments herein illustrate the digital synthetic data system 106 modifying a training sample value represented as a vector by utilizing multiplication with a distribution value, the digital synthetic data system 106 can modify various types of data corresponding to a training sample value (e.g., a list, matrix, etc.) by applying a distribution value to the data type corresponding to the training sample value.

For example, as shown in FIG. 5, the digital synthetic data system 106 generates a first modified training sample value (e.g., in the act 504) by multiplying the first training sample value (e.g., [1, 2, 3]) by a first class distribution value (e.g., the combination ratio of 0.4). Indeed, as shown in FIG. 5, the digital synthetic data system 106 generates the first modified synthetic training sample value of [0.4, 0.8, 1.2]. The first training sample value (e.g., [1, 2, 3]) represents a first class (e.g., a majority class and/or more frequent class) based on the associated ground truth label (e.g., [1,0]). As such, the digital synthetic data system 106 modifies the first training sample value (e.g., [1, 2, 3]) using the first class distribution value (e.g., 0.4). Indeed, in some embodiments, the digital synthetic data system 106 applies the first class distribution value (e.g., the value corresponding to the combination ratio) to a training sample value corresponding to a majority class (e.g., based on a ground truth label).

Furthermore, as illustrated in FIG. 5, the digital synthetic data system 106 generates a second modified training sample value (e.g., in the act 504) by multiplying the second training sample value (e.g., [4, 5, 6]) by a second class distribution value (e.g., the value of 0.6 resulting from 1 minus the combination ratio). In particular, as shown in FIG. 5, the digital synthetic data system 106 generates the second modified synthetic training sample value of [2.4, 3.0, 3.6]. Indeed, the second training sample value (e.g., [4, 5, 6]) represents a second class (e.g., a minority class and/or less frequent class) based on the associated ground truth label (e.g., [0,1]). Accordingly, the digital synthetic data system 106 modifies the second training sample value (e.g., [4, 5, 6]) using the second class distribution value (e.g., 0.6). Indeed, in one or more embodiments, the digital synthetic data system 106 applies the second class distribution value (e.g., the value corresponding to 1 minus the combination ratio) to a training sample value corresponding to a minority class (e.g., based on a ground truth label).

Additionally, the digital synthetic data system 106 can modify additional training sample values when more than two classes are present in a set of training samples. For instance, the digital synthetic data system 106 can generate a modified training sample value (e.g., a third modified training sample value) for a third class by applying an additional distribution value (e.g., a third distribution value determined as described above in FIG. 4). For example, in some embodiments, the digital synthetic data system 106 applies a third distribution value to a third training sample value corresponding to a third class (e.g., based on a ground truth label having three classes). Indeed, the digital synthetic data system 106 can modify any number of training sample values based on the number of classes present in a set of training samples and/or the number of classes corresponding to a resulting combined synthetic training value.

Moreover, as shown in FIG. 5, after generating modified training sample values based on the combination score, the digital synthetic data system 106 combines modified training sample values to generate a combined synthetic training sample value (e.g., in the act 508). For instance, as illustrated in FIG. 5, the digital synthetic data system 106 combines the first modified training sample value (e.g., [0.4, 0.8, 1.2]) and the second modified training sample value (e.g., [2.8, 3.8, 4.8]) by adding the modified training sample values to generate the combined synthetic training sample value (e.g., [2.8, 3.8, 4.8]). Indeed, the digital synthetic data system 106 can combine two or more modified training sample values by adding the modified training sample values. Although one or more embodiments herein illustrate the digital synthetic data system 106 combining the modified training sample values represented as a vector by adding the vector values, the digital synthetic data system 106 can combine various types of data corresponding to the modified training sample values (e.g., a list, matrix, etc.) by adding the data types corresponding to the modified training sample values.

Additionally, although one or more embodiments illustrate the digital synthetic data system 106 utilizing addition to combine the modified training sample values, the digital synthetic data system 106 can utilize other methods to combine the modified training sample values. For example, the digital synthetic data system 106 can utilize an average value between the modified training sample values to generate a combined synthetic training sample value. For instance, in some embodiments, the digital synthetic data system 106 can utilize the average vector value between the modified training sample values. In some embodiments, the digital synthetic data system 106 can multiply, divide, or concatenate the modified training sample values.

Moreover, the digital synthetic data system 106 can combine additional modified training sample values when more than two modified training sample values are utilized to generate a combined synthetic training sample (e.g., when more than two classes are present). For instance, the digital synthetic data system 106 can combine an additional modified training sample value (e.g., a third modified training sample value) for a third class by adding the additional modified training sample value to the other modified training sample values (e.g., the first and second modified training sample values). For example, in some embodiments, the digital synthetic data system 106 adds the third modified training sample value to the modified training sample values to generate a combined synthetic training sample value. Indeed, the digital synthetic data system 106 can generate a combined synthetic training sample value by combining any number of training sample values based on the number of classes present in a set of training samples and/or the number of classes corresponding to a resulting combined synthetic training value.

Additionally, as shown in FIG. 5, the digital synthetic data system 106 generates a combined synthetic ground truth sample (e.g., in the act 506) by utilizing the distribution values 502. Indeed, in one or more embodiments, the digital synthetic data system 106 generates a combined synthetic ground truth label using a list or set of numerical values (e.g., a list or set of numerical values that represent class types). Furthermore, as illustrated in FIG. 5, the digital synthetic data system 106 can generate the synthetic combined ground truth label by using the distribution values 502 as the list or set based values in the ground truth label. For example, as shown in FIG. 5, the digital synthetic data system 106 can utilize the first class distribution value (e.g., lambda or 0.4) for the first listed value in the combined synthetic ground truth label of the act 506 (e.g., to represent a value for a first class and/or majority class). Moreover, as illustrated in FIG. 5, the digital synthetic data system 106 can utilize the second class distribution value (e.g., 1 minus lambda) for the second listed value in the combined synthetic ground truth label of the act 506 (e.g., to represent a value for a second class and/or minority class).

Additionally, although one or more embodiments illustrate the digital synthetic data system 106 utilizing two distribution values to generate a combined synthetic ground truth label, the digital synthetic data system 106 can utilize a combined synthetic ground truth label using more than two distribution values based from one or more combination ratios. For instance, the digital synthetic data system 106 can generate a combined synthetic ground truth label having a third class by applying an additional distribution value (e.g., a third distribution value determined as described above in FIG. 4). For example, in some embodiments, the digital synthetic data system 106 utilizes a third distribution value as a third listed value in a combined synthetic ground truth label. Indeed, the digital synthetic data system 106 can generate a combined synthetic ground truth label having any number of classes.

Then, as shown in FIG. 5, the digital synthetic data system 106 generates a combined synthetic training sample in the act 510 by using the combined synthetic training sample value (from the act 508) and the combined synthetic ground truth label (from the act 506). Indeed, in one or more embodiments, the digital synthetic data system 106 associates the combined synthetic training sample value (from the act 508) to the combined synthetic ground truth label (from the act 506). For instance, the digital synthetic data system 106 can utilize a combined synthetic training sample that is generated from a combined synthetic training sample value and a combined synthetic ground truth value to represent a new example (or situation) and a corresponding outcome (e.g., the ground truth value). Moreover, the digital synthetic data system 106 can utilize the combined synthetic training samples to train a machine learning model with more training data.

In particular, in some embodiments, the digital synthetic data system 106 can iteratively repeat one or more processes described above (e.g., sample random training samples and combination ratios to generate combined synthetic training samples) to generate any number of combined synthetic training samples. Indeed, the digital synthetic data system 106 by combining one or more existing training samples using a combination ratio, the digital synthetic data system 106 can increase the number of available training samples without substantially affecting a class distribution within a set of training samples and increasingly train a machine learning model for accuracy. Furthermore, the digital synthetic data system 106 can store the generated combined synthetic training samples as a separate set of training samples and/or with existing training samples for a machine learning model.

Figure 6:
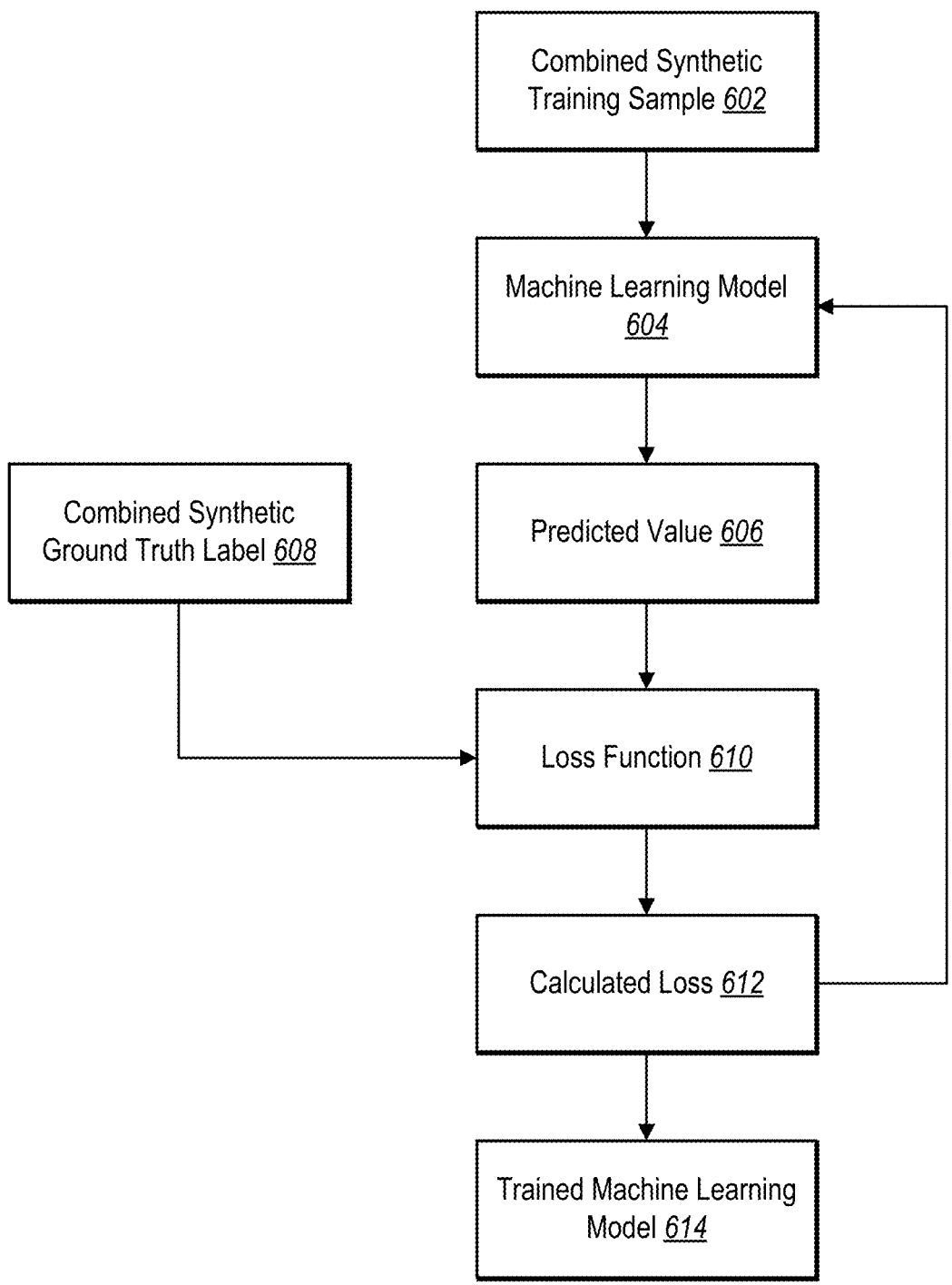
FIG. 6 illustrates a digital synthetic data system 106 utilizing a combined synthetic training sample to train a machine learning model in accordance with one or more embodiments.

As mentioned above, the digital synthetic data system 106 can utilize one or more combined synthetic training samples (generated in accordance with one or more embodiments herein) to train a machine learning model. For example, FIG. 6 illustrates the digital synthetic data system 106 utilizing a combined synthetic training sample to train a machine learning model. Indeed, as shown in FIG. 6, the digital synthetic data system 106 can utilize backpropagation to train a machine learning model using one or more combined synthetic training samples. For example, as illustrated in FIG. 6, the digital synthetic data system 106 utilizes a combined synthetic training sample 602, a predicted value 606, a combined synthetic ground truth label 608, and a calculated loss 612 to train a machine learning model 604 to generate a trained machine learning model 614.

In particular, as shown in FIG. 6, the digital synthetic data system 106 provides the combined synthetic training sample 602 (e.g., generated in accordance with one or more embodiments herein) as input to the machine learning model 604. Then, as shown in FIG. 6, the digital synthetic data system 106 generates a predicted value 606 by utilizing the machine learning model 604 with the combined synthetic training sample 602 (e.g., the combined synthetic training sample value corresponding to the combined synthetic training sample 602). Moreover, as illustrated in FIG. 6, the digital synthetic data system 106 compares the combined synthetic ground truth label 608 (e.g., the combined synthetic ground truth label corresponding to the combined synthetic training sample 602) with the predicted value 606 by utilizing a loss function 610 (e.g., mean squared error loss function, cosine similarity loss function, or another loss function).

For example, the machine learning model 604 can analyze the combined synthetic training sample 602 and predict that the combined synthetic training sample corresponds to a first class and/or determine a probability (e.g., a probability of 0.7) that the synthetic training sample corresponds to the first class. Similarly, the machine learning model can generate a prediction or probability (e.g., a probability of 0.3) that the synthetic training sample corresponds to the second class. The digital synthetic data system 106 can then compare the prediction/probability to the ground truth label (e.g., the ground truth label 0.6 and/or 0.4 from FIG. 5) using a loss function. The machine learning model can then modify parameters of the machine learning model 604 to reduce or minimize the loss.

Indeed, as illustrated in FIG. 6, the digital synthetic data system 106 can receive a calculated loss 612 from the loss function 610 upon comparing the combined synthetic ground truth label 608 and the predicted value 606. In particular, the loss function 610 can determine if the predicted value 606 accurately reflects the combined synthetic ground truth label 608. Then, as shown in FIG. 6, the digital synthetic data system 106 can provide information from the calculated loss 612 to the machine learning model 604 to adjust parameters of the machine learning model 604. For instance, in some embodiments, the digital synthetic data system 106 back-propagates the calculated loss 612. In particular, the digital synthetic data system 106 can alter parameters of the machine learning model 604 based on the calculated loss 612 to minimize future calculated loss (for future predicted values).

In one or more embodiments, the digital synthetic data system 106 utilizes the machine learning model 604 to repeatedly generate predicted values from combined synthetic training samples, compare the predicted values with combined synthetic ground truth labels, and alters parameters of the machine learning model 604 to minimize calculated loss. In some embodiments, the digital synthetic data system 106 repeats this process until a termination condition (e.g., the calculated loss 612 is minimized past a threshold, a threshold number of iterations has been satisfied, or a threshold time has passed) to generate the trained machine learning model 614.

Although FIG. 6 illustrates utilizing combined synthetic training samples to train a machine learning model, the digital synthetic data system 106 can utilize both combined synthetic training samples and existing/organic training samples to train a machine learning model. For example, the digital synthetic data system 106 can utilize a batch of training data that includes both organic/existing training samples and combined synthetic training samples to train a machine learning model.

In one or more embodiments, the digital synthetic data system 106 can utilize combined synthetic training samples generated in accordance with one or more embodiments herein to train machine learning models that correspond to the generated combined synthetic training samples (e.g., based on training samples that belong to a specific machine learning model). Indeed, the digital synthetic data system 106 can generate any number of combined synthetic training samples to train a machine learning model. By generating combined synthetic training samples generated in accordance with one or more embodiments herein to train a machine learning model, the digital synthetic data system 106 can provide machine learning models with increased accuracy and efficiency (e.g., the use of additional combined synthetic training samples can increase the accuracy of a machine learning model). Moreover, the digital synthetic data system 106 can provide more flexibility in training machine learning models that have a limited number of training samples by generating combined synthetic training samples (in accordance with one or more embodiments herein) to utilize such machine learning models accurately for classification problems that do not have adequate training samples.

As mentioned above, the digital synthetic data system 106 can improve performance accuracy relative to conventional systems. As an example, FIG. 7 illustrates experimental results of utilizing combined synthetic training samples generated by the digital synthetic data system 106 in accordance with one or more embodiments. For instance, FIG. 7 illustrates an experimental results table 700 for performance data based on training machine learning models using generated training samples from various approaches. In particular, in reference to FIG. 7, the experimental results table 700 represents experimental results conducted on a credit card fraud detection dataset.

Indeed, experimenters utilized a dataset having approximately 284,000 examples of a first class (e.g., not fraud) and approximately 490 examples of a second class (e.g., fraud). Then, experimenters trained a four-layer neural network using training samples generated using various approaches (e.g., Synthetic Minority over sampling or SMOTE, Adaptive synthetic sampling for imbalanced learning or ADASYN, Generative Adversarial Networks or GAN, and combined synthetic training samples of the digital synthetic data system 106). As shown in the experimental results table 700 of FIG. 7, the neural network, when trained using the combined synthetic training samples, outperformed other tested methods as reflected in a higher accuracy rate (e.g., a higher percentage of accuracy).

Figure 8:
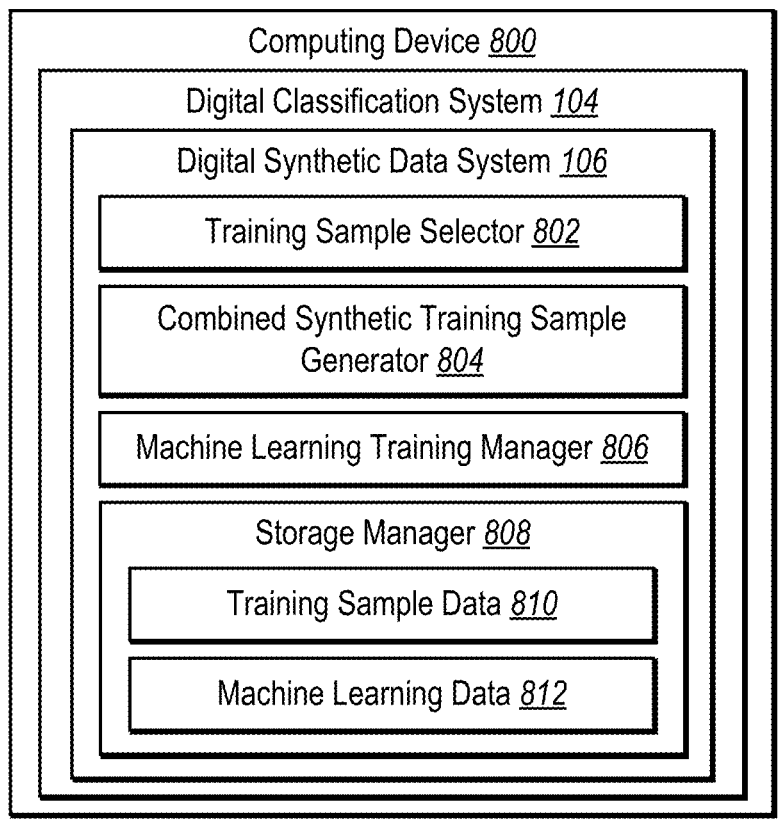
FIG. 8 illustrates a schematic diagram of a digital synthetic data system in accordance with one or more embodiments herein.

Turning now to FIG. 8, additional detail will be provided regarding components and capabilities of one or more embodiments of the digital synthetic data system. In particular, FIG. 8 illustrates an embodiment of an example digital synthetic data system 106 executed by a computing device 800 (e.g., the server device(s) 102 and/or the client device 110). As shown by the embodiment in FIG. 8, the computing device 800 can include or host the digital classification system 104 and the digital synthetic data system 106. The digital synthetic data system 106 can include a training sample selector 802, a combined synthetic training sample generator 804, a machine learning training manager 806, and a storage manager 808 which can include training sample data 810 and machine learning data 812.

As just mentioned, and as illustrated in the embodiment in FIG. 8, the digital synthetic data system 106 can include the training sample selector 802. For example, the training sample selector 802 can select (or sample) one or more training samples from a set of training samples to utilize in generating a combined synthetic training sample as described above (e.g., in relation to FIG. 3). Furthermore, the training sample selector 802 can select (or sample) one or more combination ratios and/or determine one or more distribution ratios from the one or more combination ratios as described above (e.g., in relation to FIG. 4).

Additionally, as shown in FIG. 8, the digital synthetic data system 106 can include the combined synthetic training sample generator 804. For instance, the combined synthetic training sample generator 804 can utilize training samples and selected combination ratios to generate a synthetic training sample as described above (e.g., in relation to FIG. 5). In particular, the combined synthetic training sample generator 804 can modify and combine selected training sample values using a combination ratio to generate a combined synthetic training sample value and generate a combined synthetic ground truth value (e.g., to use for generating a combined synthetic training sample) as described above (e.g., in relation to FIG. 5).

In addition, as shown in FIG. 8, the digital synthetic data system 106 can include the machine learning training manager 806. For example, the machine learning training manager 806 can train one or more machine learning models as described above (e.g., in relation to FIG. 6). In particular, the machine learning training manager 806 can train one or more machine learning models using one or more combined synthetic training samples as described above (e.g., in relation to FIG. 6).

Furthermore, as illustrated in FIG. 8, the digital synthetic data system 106 can include the storage manager 808. In some embodiments, the storage manager 808 can be implemented by one or more memory devices. The storage manager 808 can maintain data to perform one or more functions of the digital synthetic data system 106. As shown in FIG. 8, the storage manager 808 can include the training sample data 810 (e.g., training samples, combination ratios, distribution values, modified training sample values, combined synthetic training sample values, combined synthetic ground truth labels, and/or combined synthetic training samples) and the machine learning data 812 (e.g., machine learning models, calculated loss data, loss function data).

Each of the components 802-812 of the computing device 800 (e.g., the computing device 800 implementing the digital synthetic data system 106), as shown in FIG. 8, may be in communication with one another using any suitable communication technologies. It will be recognized that although components 802-812 of the computing device 800 (or computer device) are shown to be separate in FIG. 8, any of components 802-812 may be combined into fewer components, such as into a single facility or module, divided into more components, or configured into different components as may serve a particular embodiment.

The components 802-812 of the computing device 800 can comprise software, hardware, or both. For example, the components 802-812 can comprise one or more instructions stored on a computer-readable storage medium and executable by processors of one or more computing devices. When executed by the one or more processors, the computer-executable instructions of the digital synthetic data system 106 (e.g., via the computing device 800) can cause a client device and/or a server device to perform the methods described herein. Alternatively, the components 802-812 and their corresponding elements can comprise hardware, such as a special purpose processing device to perform a certain function or group of functions. Additionally, the components 802-812 can comprise a combination of computer-executable instructions and hardware.

Furthermore, the components 802-812 of the digital synthetic data system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-812 may be implemented as a stand-alone application, such as a desktop or mobile application. Furthermore, the components 802-812 may be implemented as one or more web-based applications hosted on a remote server. The components 802-812 may also be implemented in a suite of mobile device applications or "apps." To illustrate, the components 802-812 may be implemented in an application, including but not limited to, ADOBE® SENSEI, ADOBE® ANALYTICS CLOUD, such as ADOBE® ANALYTICS, ADOBE® AUDIENCE MANAGER, ADOBE® CAMPAIGN, ADOBE® EXPERIENCE MANAGER, ADOBE® TARGET, and ADOBE® PHOTOSHOP. "ADOBE," "ADOBE SENSEI," "ADOBE ANALYTICS CLOUD," "ADOBE ANALYTICS," "ADOBE AUDIENCE MANAGER," "ADOBE CAMPAIGN," "ADOBE EXPERIENCE MANAGER," "ADOBE TARGET," and "ADOBE PHOTOSHOP" are either registered trademarks or trademarks of Adobe Inc. in the United States and/or other countries.

Figure 9:
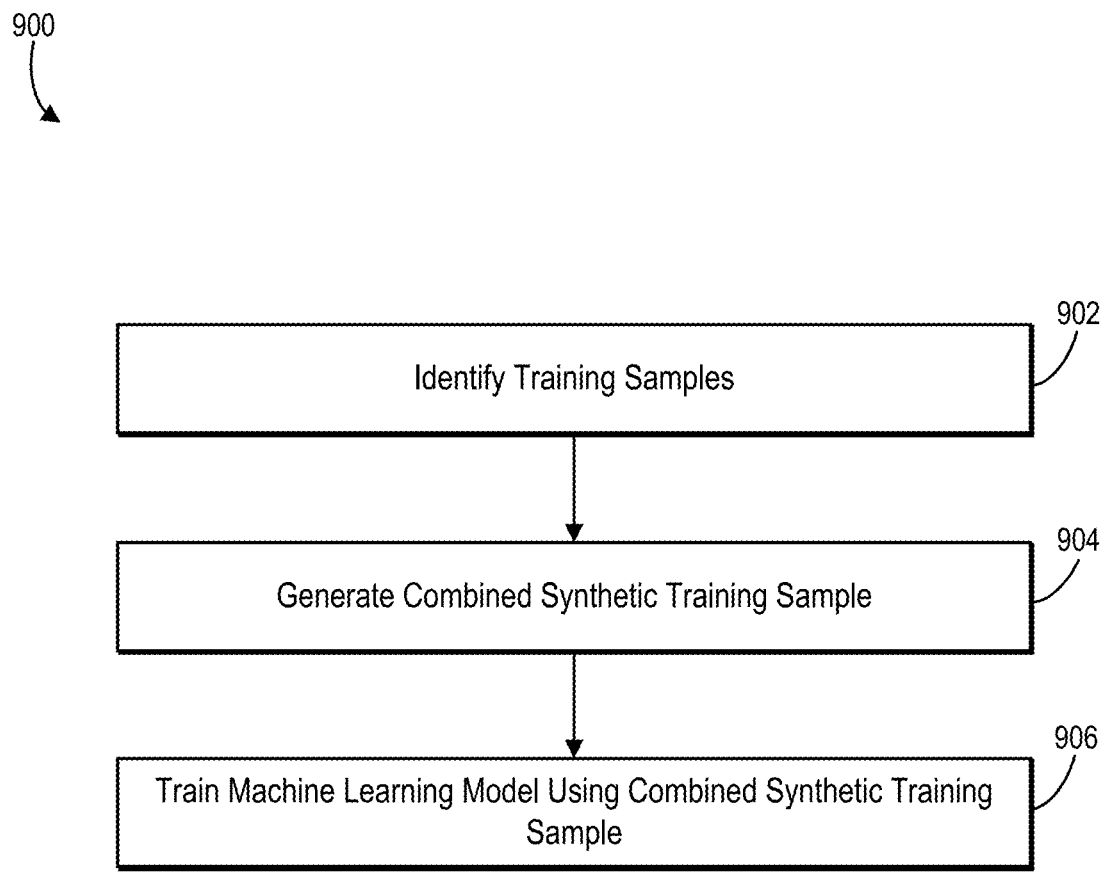
FIG. 9 illustrates a flowchart of a series of acts for generating combined synthetic training samples to train a machine learning model in accordance with one or more embodiments.

FIGS. 1-8, the corresponding text, and the examples provide a number of different methods, systems, devices, and non-transitory computer-readable media of the digital synthetic data system 106. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned above, FIG. 9 illustrates a flowchart of a series of acts 900 for generating combined synthetic training samples to train a machine learning model in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As illustrated in FIG. 9, the series of acts 900 include an act 902 of identifying training samples. In particular, the act 902 can include identifying a first training sample having a first training sample value and a first ground truth label corresponding to a first class within a set of training samples.

Moreover, the act 902 can include identifying a second training sample having a second training sample value and a second ground truth label corresponding to a second class within a set of training samples. For example, a first class can correspond to a majority class within a set of training samples. In addition, a second class can correspond to a minority class within a set of training samples. Additionally, the act 902 can include identifying a first training sample having a first ground truth label corresponding to a majority class within a set of training samples. Furthermore, the act 902 can include identifying a second training sample having a second ground truth label corresponding to a minority class within a set of training samples. Moreover, a first training sample can include a first set of training sample values and a first ground truth label corresponding to a first class. Additionally, a second training sample can include a second set of training sample values and a second ground truth label corresponding to a second class.

In addition, the act 902 can include utilizing a combination ratio. For example, the act 902 can include utilizing a combination ratio to determine a first class distribution value and a second class distribution value. For instance, the act 902 can include a combination ratio that is sampled based on a probability distribution. Furthermore, as an example, a probability distribution can include at least one of a uniform distribution or a beta distribution. Additionally, the act 902 can include utilizing a combination ratio to determine a first class distribution value and a second class distribution value.

Moreover, the act 902 can include identifying a third training sample having a third training sample value and a third ground truth label corresponding to a third class within a set of training samples. In addition, the act 902 can include utilizing a combination ratio to determine a third class distribution value.

As illustrated in FIG. 9, the series of acts 900 also include an act 904 of generating a combined synthetic training sample. For example, a combined synthetic training sample can include a combined synthetic training sample value and a combined synthetic ground truth label. In particular, the act 904 can include generating a combined synthetic training sample value to train a machine learning model by combining a first training sample value modified by a first class distribution value and a second training sample value modified by a second class distribution value. Moreover, the act 904 can include combining a first training sample value modified by a first class distribution value and a second training sample value modified by a second class distribution value by generating a modified first training sample value by applying the first training sample value to the first class distribution value, generating a modified second training sample value by applying the second training sample value to the second class distribution value, and combining the modified first training sample value and the modified second training sample value. Furthermore, the act 904 can include generating a combined synthetic training sample value to train a machine learning model by combining a first training sample value modified by a first class distribution value, a second training sample value modified by a second class distribution value, and a third training sample value modified by a third class distribution value.

Additionally, the act 904 can include generating a combined synthetic training sample by combining a first set of training sample values and a second set of training sample values utilizing a combination ratio to generate a combined set of synthetic training sample values and generating a combined synthetic ground truth label for the combined synthetic training sample based on the combination ratio.

Moreover, the act 904 can include combining a first set of training sample values and a second set of training sample values utilizing a combination ratio to generate a combined set of synthetic training sample values by generating a modified set of first training sample values by applying a first class distribution value to the first set of training sample values, generating a modified set of second training sample values by applying a second class distribution value to the second set of training sample values, and generating the combined set of synthetic training sample values by combining the modified set of first training sample values and the modified set of second training sample values. Additionally, the act 904 can include generating a combined set of synthetic training sample values by adding a modified first set of training sample values to a modified set of second training sample values.

Furthermore, the act 904 can include generating a combined synthetic ground truth label for a combined synthetic training sample value based on a first class distribution value and a second class distribution value. For example, a combined synthetic ground truth label can include a first class distribution value and a second class distribution value. In addition, the act 904 can include generating a combined synthetic ground truth label for a combined synthetic training sample by generating a ground truth set comprising a first class distribution value and a second class distribution value.

In addition to (or in the alternative to) the acts above, the digital synthetic data system 106 can also perform a step for generating a combined synthetic training sample from a first training sample and a second training sample using a combination ratio. For example, the acts and algorithms described above in relation to FIG. 5 (e.g., the acts 502-510) can comprise the corresponding acts and algorithms (i.e., structures) for performing a step for generating a combined synthetic training sample from a first training sample and a second training sample using a combination ratio.

As illustrated in FIG. 9, the series of acts 900 also include an act 906 of training a machine learning model using a combined synthetic training sample. In particular, the act 906 can include generating a predicted classification utilizing a machine learning model based on a combined synthetic training sample value (e.g., to train a machine learning model). Furthermore, the act 906 can include comparing a predicted classification to a combined synthetic ground truth label (e.g., to train a machine learning model). Moreover, the act 906 can include training a machine learning model utilizing a combined set of synthetic training sample values and a combined synthetic ground truth label.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
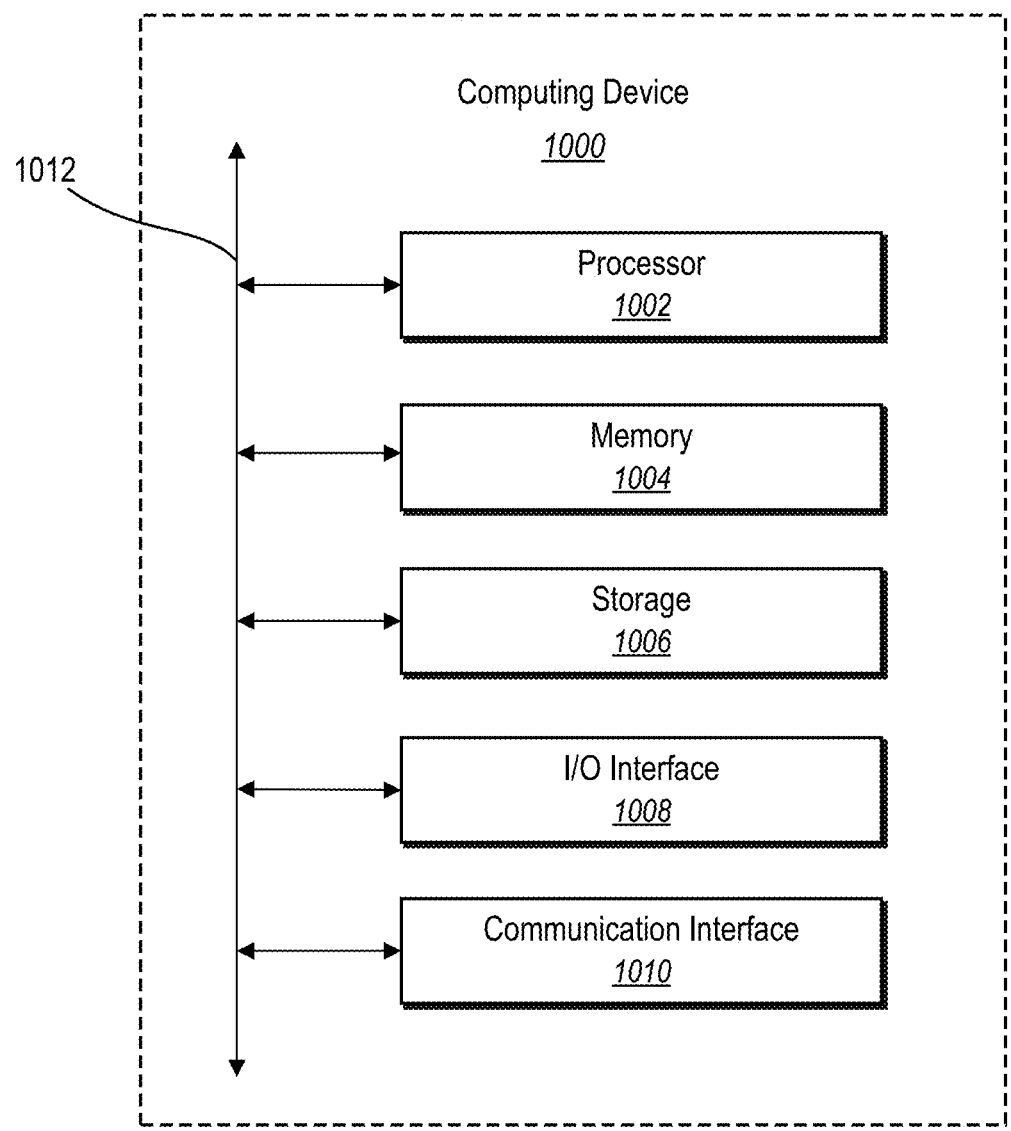
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server device(s) 102, and client device 110). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying a first training sample having a first training sample value and a first ground truth label corresponding to a first class within a set of training samples;
   identifying a second training sample having a second training sample value and a second ground truth label corresponding to a second class within the set of training samples;
   utilizing a combination ratio to determine a first class distribution value and a second class distribution value;
   generating a first modified training sample value for the first training sample by modifying the first training sample value utilizing the first class distribution value;
   generating a second modified training sample value for the second training sample value by modifying the second training sample value utilizing the second class distribution value;
   generating a combined synthetic training sample value by combining the first modified training sample value corresponding to the first training sample and the second modified training sample value corresponding to the second training sample; and
   training a machine learning model utilizing the combined synthetic training sample value.

2. The computer-implemented method of claim 1, further comprising generating a combined synthetic ground truth label for the combined synthetic training sample value.

3. The computer-implemented method of claim 2, wherein training the machine learning model further comprises:
   generating a predicted classification utilizing the machine learning model based on the combined synthetic training sample value; and
   comparing the predicted classification to the combined synthetic ground truth label.

4. The computer-implemented method of claim 1, wherein the combination ratio is sampled based on a probability distribution.

5. A non-transitory computer-readable medium storing instructions that, when executed by at least one processor, cause a computer device to perform operations comprising:
   identifying a first training sample having a first training sample value and a first ground truth label corresponding to a first class within a set of training samples;
   identifying a second training sample having a second training sample value and a second ground truth label corresponding to a second class within the set of training samples;
   utilizing a combination ratio to determine a first class distribution value and a second class distribution value;
   generating a first modified training sample value for the first training sample by modifying the first training sample value utilizing the first class distribution value;
   generating a second modified training sample value for the second training sample value by modifying the second training sample value utilizing the second class distribution value;
   generating a combined synthetic training sample value by combining the first modified training sample value corresponding to the first training sample and the second modified training sample value corresponding to the second training sample; and
   training a machine learning model utilizing the combined synthetic training sample value.

6. The non-transitory computer-readable medium of claim 5, further storing instructions that, when executed by the at least one processor, cause the computer device to perform operations comprising generating a combined synthetic ground truth label for the combined synthetic training sample value.

7. The non-transitory computer-readable medium of claim 6, further storing instructions that, when executed by the at least one processor, cause the computer device to perform operations comprising:
   generating a first modified ground truth label for the first training sample by utilizing the first class distribution value with a first ground truth label corresponding to the first training sample;
   generating a second modified ground truth label for the second training sample by utilizing the second class distribution value with a second ground truth label corresponding to the second training sample; and
   generating the combined synthetic ground truth label by combining the first modified ground truth label and the second modified ground truth label.

8. The non-transitory computer-readable medium of claim 5, wherein the machine learning model comprises a neural network or a decision tree model.

9. The non-transitory computer-readable medium of claim 5, wherein generating the combined synthetic training sample value comprises performing element-wise addition of a first set of vector values that includes the first modified training sample value modified and a second set of vector values that includes the second modified training sample value modified.

10. The non-transitory computer-readable medium of claim 5, wherein the combination ratio is sampled based on a probability distribution, wherein the probability distribution comprises at least one of a uniform distribution or a beta distribution.

11. The non-transitory computer-readable medium of claim 5, further comprising instructions that, when executed by the at least one processor, cause the computer device to perform operations comprising:
   identifying a third training sample having a third training sample value and a third ground truth label corresponding to a third class within the set of training samples;
   utilizing the combination ratio to determine a third class distribution value; and
   generating a third modified training sample value modified by the third class distribution value.

12. The non-transitory computer-readable medium of claim 11, wherein generating the combined synthetic training sample value comprises combining the first modified training sample value modified by the first class distribution value, the second modified training sample value modified by the second class distribution value, and the third modified training sample value modified by the third class distribution value.

13. The non-transitory computer-readable medium of claim 6, wherein training the machine learning model comprises:
generating a predicted classification utilizing the machine learning model based on the combined synthetic training sample value; and
comparing the predicted classification to the combined synthetic ground truth label.

14. A system comprising:
one or more memory devices comprising a plurality of training samples having:
a first training sample comprising a first set of training sample values and a first ground truth label corresponding to a first class; and
a second training sample having a second set of training sample values and a second ground truth label corresponding to a second class; and
one or more server devices that cause the system to train a machine learning model by:
sampling a combination ratio based on a probability distribution to determine a first class distribution value and a second class distribution value;
generating a first modified set of training sample values by modifying the first set of training sample values by the first class distribution value;
generating a second modified set of training sample values by modifying the second set of training sample values by the second class distribution value;
generating a combined synthetic training sample by:
combining the first modified set of training sample values and the second modified set of training sample values to generate a combined set of synthetic training sample values; and
generating a combined synthetic ground truth label for the combined synthetic training sample from the first ground truth label and the second ground truth label based on the first class distribution value and the second class distribution value; and
training the machine learning model utilizing the combined set of synthetic training sample values and the combined synthetic ground truth label.

15. The system of claim 14, wherein the one or more server devices further cause the system to utilize the combination ratio to determine the first class distribution value and the second class distribution value by:
assigning the first class distribution value as the combination ratio; and
assigning the second class distribution value as a difference between a value of one and the combination ratio.

16. The system of claim 14, wherein:
generating the first modified set of training sample values comprises multiplying the first class distribution value and the first set of training sample values; and
generating the second modified set of training sample values comprises multiplying the second class distribution value and the second set of training sample values.

17. The system of claim 14, wherein generating the combined synthetic ground truth label for the combined synthetic training sample comprises combining a first modified ground truth label based on the first ground truth label and the first class distribution value and a second modified ground truth label based on the second ground truth label and the second class distribution value.

18. The system of claim 14, wherein generating the combined set of synthetic training sample values comprises adding the first modified set of training sample values and the second modified set of training sample values.

19. The system of claim 14, wherein:
the first class corresponds to a majority class within the first training sample; and
the second class corresponds to a minority class within the second training sample.

20. The system of claim 14, wherein training the machine learning model utilizing the combined set of synthetic training sample values and the combined synthetic ground truth label comprises:
generating a predicted classification utilizing the machine learning model based on the combined set of synthetic training sample values; and
comparing the predicted classification to the combined synthetic ground truth label.

* * * * *